United States Patent
Salles (10) Patent No.: US 11,186,273 B2
(45) Date of Patent: Nov. 30, 2021

(54) VEHICLE DATA PROCESSING SYSTEMS AND METHODS USING ONE OR MORE LOCAL PROCESSORS

(71) Applicant: Toyota Motor North America, Inc., Plano, TX (US)

(72) Inventor: Felipe G. Salles, Garland, TX (US)

(73) Assignee: TOYOTA MOTOR NORTH AMERICA, INC., Plano, TX (US)

(*) Notice: Subject to any disclaimer, the term of this patent is extended or adjusted under 35 U.S.C. 154(b) by 303 days.

(21) Appl. No.: 16/175,294

(22) Filed: Oct. 30, 2018

(65) Prior Publication Data

US 2020/0130679 A1     Apr. 30, 2020

(51) Int. Cl.
| | |
|---|---|
| *B60W 30/09* | (2012.01) |
| *G08G 1/16* | (2006.01) |
| *H04L 12/40* | (2006.01) |
| *H04W 4/40* | (2018.01) |

(52) U.S. Cl.
CPC ............ *B60W 30/09* (2013.01); *G08G 1/162* (2013.01); *G08G 1/166* (2013.01); *H04L 12/40* (2013.01); *H04W 4/40* (2018.02); *H04L 2012/40215* (2013.01)

(58) Field of Classification Search
CPC ........ B60W 30/09; H04W 4/40; G08G 1/162; G08G 1/166; H04L 12/40; H04L 2012/40215
See application file for complete search history.

(56) References Cited

U.S. PATENT DOCUMENTS

| | | | |
|---|---|---|---|
| 5,530,420 A | 6/1996 | Tsuchiya et al. | |
| 5,594,413 A | 1/1997 | Cho et al. | |
| 6,122,580 A | 9/2000 | Autermann | |
| 9,811,354 B2 | 6/2017 | Preston | |
| 10,007,269 B1* | 6/2018 | Gray | G06K 9/00805 |
| 2005/0071070 A1* | 3/2005 | Nilsson | B60T 8/321 |
| | | | 701/70 |
| 2014/0297117 A1* | 10/2014 | Near | B60G 17/015 |
| | | | 701/37 |
| 2014/0309864 A1* | 10/2014 | Ricci | G01C 21/365 |
| | | | 701/36 |
| 2015/0224845 A1* | 8/2015 | Anderson | B60G 17/019 |
| | | | 701/37 |

(Continued)

FOREIGN PATENT DOCUMENTS

| | | |
|---|---|---|
| CN | 104044526 | 4/2017 |
| CN | 106828460 | 6/2017 |
| DE | 19924753 | 11/2000 |

OTHER PUBLICATIONS

Jehangir Khan1; Smail Niar1;Atika Menhaj; Yassin Elhillal; and Jean Luc Dekeyser, An MPSoC Architecture for the Multiple Target Tracking Application in Driver Assistant System, published 2008 in IEEE, 6 pages.

*Primary Examiner* — Behrang Badii
(74) *Attorney, Agent, or Firm* — Dinsmore & Shohl, LLP (57) ABSTRACT

A vehicle data processing method includes receiving data points from one or more sensors arranged in or around a vehicle, identifying one or more emergency events based on the received data points from the sensors, determining, with the one or more local processors of a vehicle, an instant reaction in response to the emergency events, and controlling a control mechanism of the vehicle based on the determined instant reaction.

19 Claims, 6 Drawing Sheets

(56) References Cited

U.S. PATENT DOCUMENTS

2017/0144658 A1\* 5/2017 Viehmann .......... B62D 15/0265
2017/0301207 A1 10/2017 Davis et al.
2018/0157921 A1\* 6/2018 Salomonsson ... G08G 1/096766

\* cited by examiner

VEHICLE DATA PROCESSING SYSTEMS AND METHODS USING ONE OR MORE LOCAL PROCESSORS

TECHNICAL FIELD

Embodiments described herein generally relate to vehicle data processing systems and methods, and more specifically, vehicle data processing systems and methods using a local processor in order to minimize data latency and data lag and mitigate and avoid emergency situations.

BACKGROUND

Vehicle drivers may encounter emergency situations while driving vehicles. More specifically, vehicles may experience crashes, pedestrians jumping into roads, animals crossing roads and crashing into vehicles, objects falling from vehicles driving nearby, etc. These emergency situations may be unpredictable and take place in a very short time. Vehicles may need to react to these situations without any delay and immediately take appropriate action in order to avoid crashes or injury. For instance, three seconds may not be fast enough to stop a car in order to avoid a child jumping into the street.

Currently, vehicles include a main processor that handles data processing and determines actions taken by vehicles. There are a large number of sensors mounted on vehicles and arranged at various locations. The volume of data generated and handled by vehicles is drastically on the rise. The vehicle main processor handles a large volume of data processing for various purposes and may need to determine various actions in response to encountered situations. The processing load on and the processing time by the vehicle main processor may increase as the data volume increases.

Accordingly, there is a need to provide vehicle data processing systems and methods for distributing processing load imposed on the main processor and facilitating vehicles to address emergency situations without significant potential delay caused by data lag. Also, there is a need to provide vehicle data processing systems and methods for providing fast and immediate responses to emergency situations in order to mitigate or prevent the consequence of the emergency situations.

SUMMARY

In one embodiment, a vehicle data processing method includes receiving data points from one or more sensors arranged in or around a vehicle, identifying one or more emergency events based on the received data points, determining, with one or more local processors of a vehicle, an instant reaction in response to the emergency events, and controlling a control mechanism of the vehicle based on the determined instant reaction. The vehicle data processing method further includes arranging a main processor and arranging the one or more local processors in proximity to one of the sensors, the control mechanisms, or both.

In another embodiment, a vehicle data processing system for a vehicle includes a first local processor associated with a first emergency event detected by a first group of sensors in data processing proximity to the first local processor, and a second local processor associated with a second emergency event detected by a second group of sensors in data processing proximity to the second local processor. The first local processor is operable to identify the first emergency event based on data points from the first group of sensors and determine a first instant reaction in response to the first emergency event. The second local processor is operable to identify the second emergency event based on the data points from the second group of sensors and determine a second instant reaction in response to the second emergency event. The vehicle data processing system further includes one or more control mechanisms operable to control a motion of a vehicle based on the first instant reaction, the second instant reaction, or both.

In another embodiment, a vehicle data processing system includes a main processor, one or more control mechanisms, one or more local processing units, each of the one or more local processing units including a local processor in proximity to one or more sensors, the control mechanisms, or both, a memory module coupled to the local processor, machine readable instructions stored in the memory, and a control area network (CAN) bus connected to the main processor, the control mechanisms, and the one or more local processing units. The machine readable instructions, upon execution by the local processor, perform at least the following including (i) receiving data points from the sensors, (ii) identifying one or more emergency events based on the data points from the one or more sensors, (iii) determining an instant reaction in response to the identified emergency events, and (iv) outputting the instant reaction to the control mechanisms. The one or more control mechanisms are configured to perform or suppress a motion of a vehicle.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Connected cars are equipped to communicate with other devices, utilizing connectivity available via wireless and/or cellular networks. Connected cars may be connected to and communicate with the surroundings. Connected cars may communicate via a variety of communication models, including Vehicle to Infrastructure ("V2I"), Vehicle to Vehicle ("V2V"), Vehicle to Cloud ("V2C"), and Vehicle to Everything ("V2X") communication models. A V2I communication model facilitates the communication between a vehicle and one or more infrastructure devices, which may enable the exchange of data generated by a vehicle and information about the infrastructure. A V2V communication model facilitates the communication between vehicles and may allow for the exchange of data generated by surrounding vehicles, including speed and position information of surrounding vehicles. A V2C communication model facilitates the exchange of information between a vehicle and a cloud system. A V2X communication model interconnects all types of vehicles and infrastructure systems with another.

As discussed above, connected cars operate to capture and generate a large amount of data about a vehicle, surrounding vehicles, the environment, etc. Connected cars may seamlessly transmit such data to surrounding vehicles, a cloud server, other infrastructure, etc. and communicate with them via the network. The embodiments of the vehicle data processing systems and methods include connected cars. The embodiments disclosed herein include vehicle data processing systems and methods that may handle a large amount of data generated by various components such as vehicle sensors.

In the embodiments disclosed herein, the vehicle data processing systems and methods may include a main processor and one or more local processors positioned in a vehicle at various locations. In some embodiment, the locations of the local processors may be positioned apart from the main processor within the vehicle. Such locations may need to be selected to minimize data latency and data lag relative to relevant vehicle components. In some embodiments, the locations may be in proximity to vehicle components such as vehicle sensors that generate data points, a mechanism that controls a motion of a vehicle, etc.

In the embodiments described herein, the one or more local processors are operable to determine an initial and instant reaction based on data available to the local processors at a first time. The main processor may analyze and supplement the initial and instant reaction determined by the local processor at a second time after the first time. In some embodiments, the main processor is operable to be trained to update and supplement the initial and instant reaction later based on the analysis with respect to a set of data available to the local processors at the first time. Alternatively, the analysis and the supplement may be performed at a cloud server. The various vehicle data processing systems and methods will be described in more detail herein with specific reference to the corresponding drawings.

Figure 1:
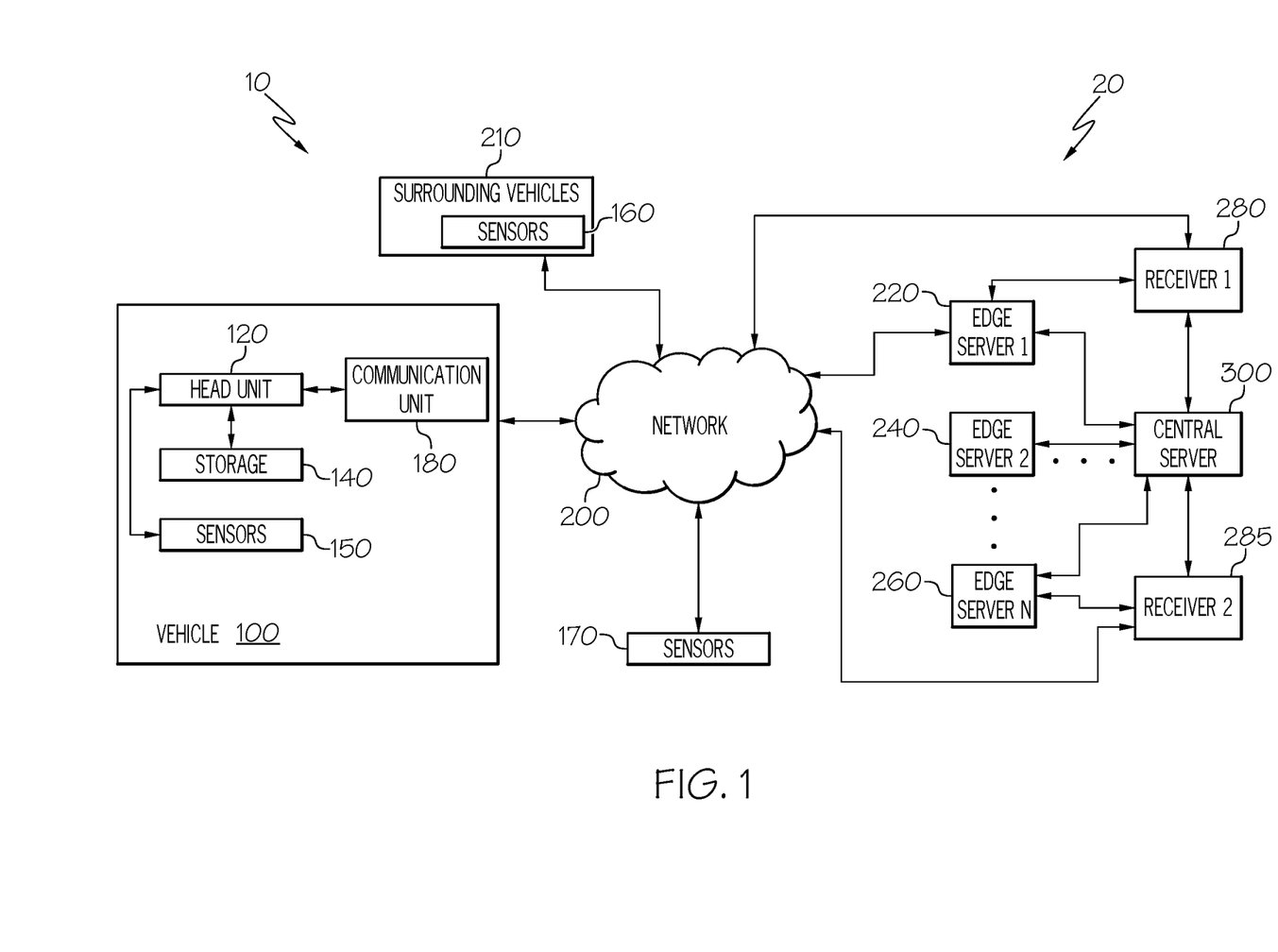
FIG. 1 schematically depicts a connected cars system according to one or more embodiments shown and described herein.

FIG. 1 schematically depicts a connected cars system 10 including a vehicle 100 and a cloud computing system 20. The vehicle 100 includes a head unit 120, storage 140 and various sensors 150. The head unit 120 controls operation of the vehicle 100 based on data points captured and sent from the sensors 150. The storage 140 is coupled to the head unit 120 and stores a set of data points under the control of the head unit 120. The sensors 150 include various types of sensors used in the vehicle 100. In some embodiments, the sensors 150 include one or more cameras, an accelerometer, a proximity sensor, a braking sensor, a motion sensor, etc. However, the sensors 150 used in the vehicle 100 may not be limited thereto and other sensors can be used.

In some embodiments, the vehicle 100 also receives data points from other sensors 170 that may be arranged outside of the vehicle 100. For example, the sensors 170 may be arranged on or within buildings such as a parking structure, municipal infrastructure, the surroundings of the vehicle 100, etc. The vehicle 100 may receive data points from the sensors 170 via the network 200. Alternatively, or additionally, a cloud server may receive data from the sensors 170. The network 200 may include a cellular network, a WiFi network, a near field network, or any other available communication network. In other embodiments, the vehicle 100 may receive the data points from surrounding vehicles 210 via a V2V communication channel. Like the sensors 150, various types of sensors such as one or more cameras, an accelerometer, a proximity sensor, a braking sensor, a motion sensor, etc. may be used as the sensors 170.

As shown in FIG. 1, the vehicle 100 includes a communication unit 180 that exchanges data and information between the vehicle 100 and a network 200. As shown in FIG. 1, the vehicle 100 may be connected and communicate with one or more edge servers 220, 240 and 260. The edge servers 220, 240 and 260 may be connected and communicate with a central server 300. The central server 300 may be in communication with receivers 280, 285. Receivers 280 and 285 such as Receiver 1 and Receiver 2 may connect vehicles with the central server 300 as an intermediary.

The central server 300 may represent a cloud server run by a commercial network carrier or another entity, such as a municipality, to operate as a node. For instance, a particular city may run a cloud server as a node to receive reports relating to road conditions, such as the presence and/or location of pot holes, from vehicles. In some embodiments, edge servers 1, 2 . . . N 220, 240 and 260 may represent such cloud nodes for various purposes run by various entities and the central server 300 may be a server that includes logic to coordinate communication among those nodes and the overall vehicle data offloading systems.

Figure 2:
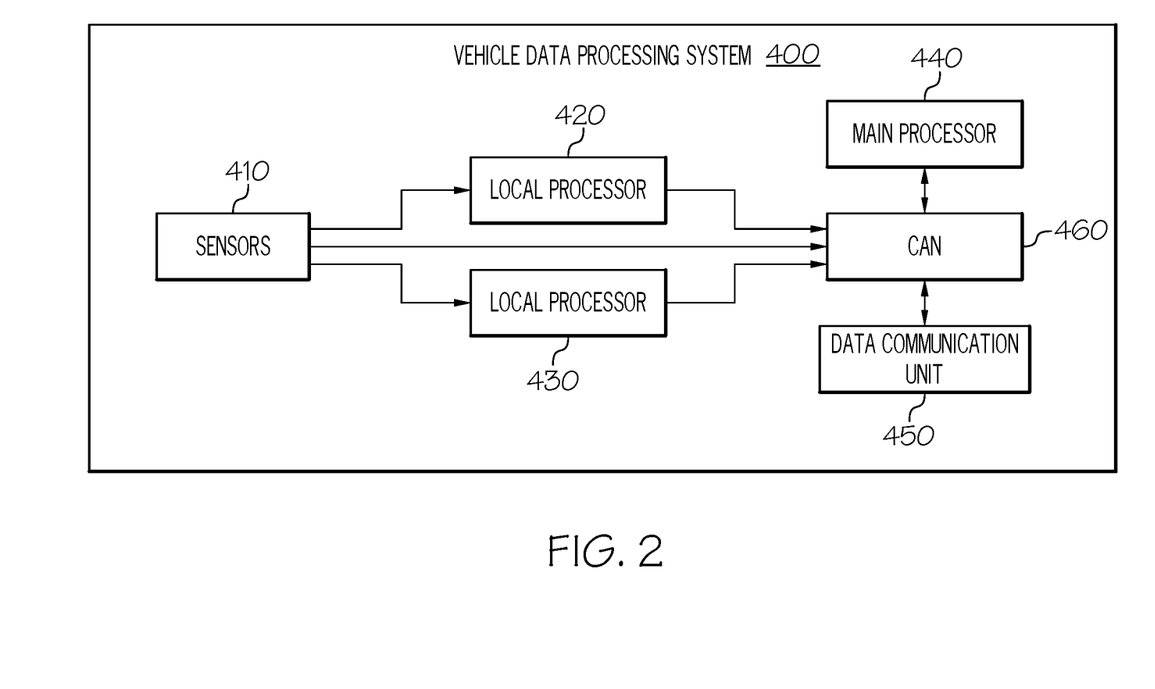
FIG. 2 schematically depicts a block diagram of a vehicle data processing system according to one or more embodiments shown and described herein.

Referring to FIG. 2, the structure and operation of a vehicle data processing system 400 according to one or more embodiments are shown and described herein. In some embodiments, the vehicle data processing system 400 may be implemented in the head unit 120 as shown in FIG. 1. In other embodiments, the vehicle data processing system 400 may be implemented, independently of and separately from the head unit 120.

The structure and operation of the vehicle data processing system 400 are explained in detail. The vehicle data processing system 400 includes sensors 410, local processors 420 and 430, a main processor 440, a CAN bus 460, and a data communication unit 450. The sensors 410 are connected to the local processors 420 and 430 and additionally, connected to the main processor 440 via the CAN bus 460. The data communication unit 450 is connected to other systems such as a cloud across the network 200. As shown in FIG. 1, the data communication unit 450 is communicatively connected to the various edge servers 220, 240 and 260, the receivers 280, 285 and/or the central server 300. The vehicle 400 may be communicated via a WiFi network, a cellular network, a near field network, etc.

FIG. 2 illustrates two local processors 420 and 430 but the vehicle data processing system 400 may not be limited to two local processors 420 and 430. One local processor, or three or more local processors may be arranged in the vehicle data processing system 400. Relevant factors such as the amount of data points, system cost, vehicle structures, etc. may be considered in determining a number of local processors.

Figure 3:
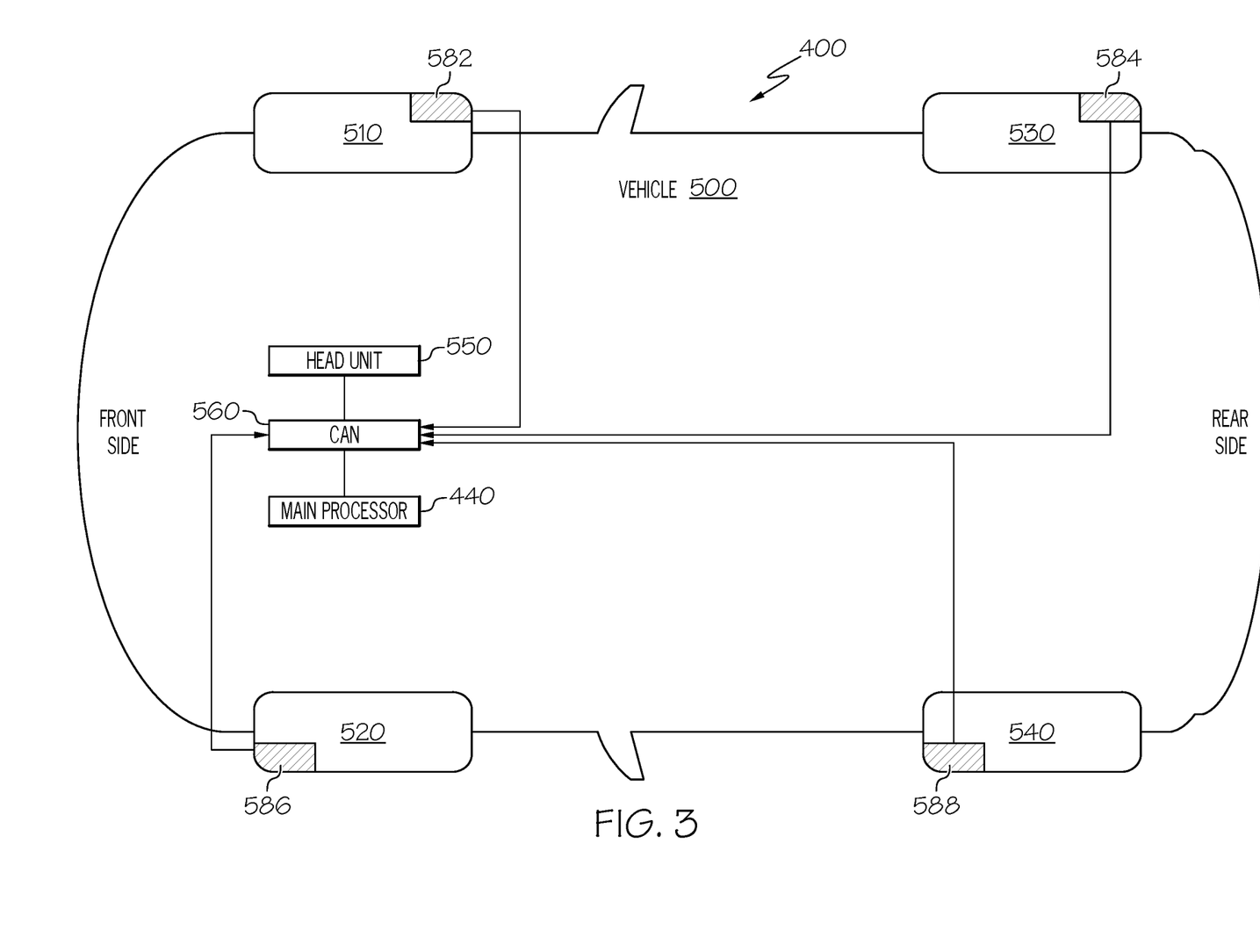
FIG. 3 schematically depicts a system configuration of a vehicle data processing system according to one or more embodiments shown and described herein.

FIG. 3 depicts schematically depicts a system configuration of a vehicle data processing system according to one or more embodiments shown and described herein. As shown in FIG. 3, a vehicle 500 includes a front side and a rear side along with four wheels 510, 520, 530 and 540. In other embodiments, the vehicle 500 may not be limited to four wheels and have more or less wheels. As shown in FIG. 3, each wheel 510, 520, 530 and 540 has a local processing system arranged therein. The embodiment shown in FIG. 3 has four local processing systems 582, 584, 586 and 588 associated with wheels 510, 520, 530 and 540, respectively, but the system configuration of the vehicle 500 may not be limited to the four local processing systems. For instance, there may be one or two local processing systems, or more than four local processing systems arranged in the vehicle 500.

In FIG. 3, the local processing systems 582, 584, 586 and 588 are connected to the main processor 440 via a CAN bus 560. The main processor 440 is in communication with the local processing systems 582, 584, 586 and 588 and receives signals from the local processing systems regarding determinations and messages representing actions made by them, as will be discussed more in detail below. Although not shown in FIG. 3, the vehicle 500 includes various types of sensors at various locations. For example, the sensors include a camera, a pressure sensor, a passenger seat sensor, a front sensor, a rear sensor, an accelerometer, a speed sensor, a pretensioner, a brake sensor, etc. The main processor 440 is configured to receive data points from those sensors and control overall functions and operations of the vehicle 500. On the other hand, the local processing systems 582, 584, 586 and 588 may be assigned with particular functions and specific tasks.

In some embodiments, local processors of the local processing systems 582, 584, 586 and 588 may be configured to address emergency situations and have functionality customized and/or limited to such purposes. The local processing systems 582, 584, 586 and 588 may function to perform distributed processing for handling the instant responses and/or the instant reactions to the emergency situations. In one aspect, the local processing systems 582, 584, 586 and 588 may be physically positioned at a location suitable for faster but limited processing with respect to the emergency situations. In other words, the local processing systems 582, 584, 586 and 588 may be physically positioned proximate to the emergency situations, devices for detecting the emergency situations, mechanisms for controlling a motion of a vehicle, or a combination thereof. In another aspect, the local processing systems 582, 584, 586 and 588 may be physically positioned at a location for effective and faster data transmission and/or data processing. The implementation of processing capacity for the local processing systems 582, 584, 586 and 588 may be made.

In some embodiments, the local processing systems 582, 584, 586 and 588 may be assigned with tasks that either mitigate or prevent crashes or injury resulting from emergency situations. The emergency situations described here involve unpredictable events that take place in a very short time and may potentially lead to injury or harm to vehicle occupants, pedestrians, and/or other vehicle occupants. For instance, the emergency situations include situations where a child is jumping in front of a moving vehicle, a deer is suddenly crashing into a moving vehicle, a vehicle is sliding on a slippery surface due to snow or ice, a vehicle occupant is trying to open a car door without knowing another vehicle is approaching in proximity to the car door, etc.

Figure 4:
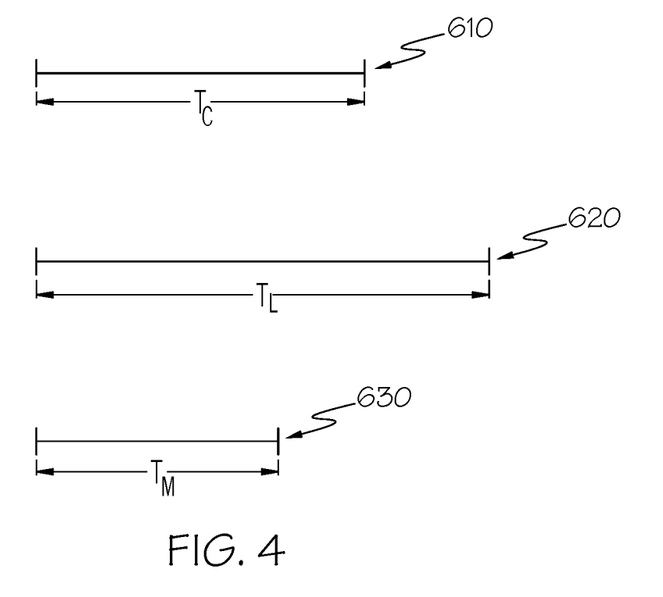
FIG. 4 depicts relevant timing components relating to data latency according to one or more embodiments shown and described herein.

The emergency situations may potentially lead to accidents involving injuries on occupants and pedestrians and/or damage to vehicles. The emergency situations take place unexpectedly and in a very short amount of time. FIG. 4 depicts relevant timing components. A critical time ($T_C$) 610 during which accidents happen is extremely short. The critical time ($T_C$) 610 here corresponds to the time preceding an accident, i.e., the time before any accident happens. As discussed above, a reaction within 3 seconds may not be fast enough to avoid accidents resulting from a pedestrian jumping in front of a moving vehicle. Accordingly, if a moving vehicle stops 5 seconds later, it may not be fast enough to mitigate or avoid an accident. As shown in FIG. 4, if a mitigating time ($T_M$) 630 is shorter than the critical time ($T_C$) 610, the consequence of an accident may be mitigated or the accident itself may be avoided.

As discussed above, it may be beneficial to reduce or minimize a time for vehicles to respond to the emergency situations. In order to improve the vehicle response time, any delay resulting from data latency and data lag should be considered and minimized. As shown in FIG. 4, by way of example, if a delay time from data latency ($T_L$) 620 may be longer than the critical time ($T_C$) 610, it may be difficult for vehicles to respond to the emergency situations faster than the critical time ($T_C$) 610. Thus, injury and damage resulting from the emergency situations may not be mitigated or avoided.

Figure 5:
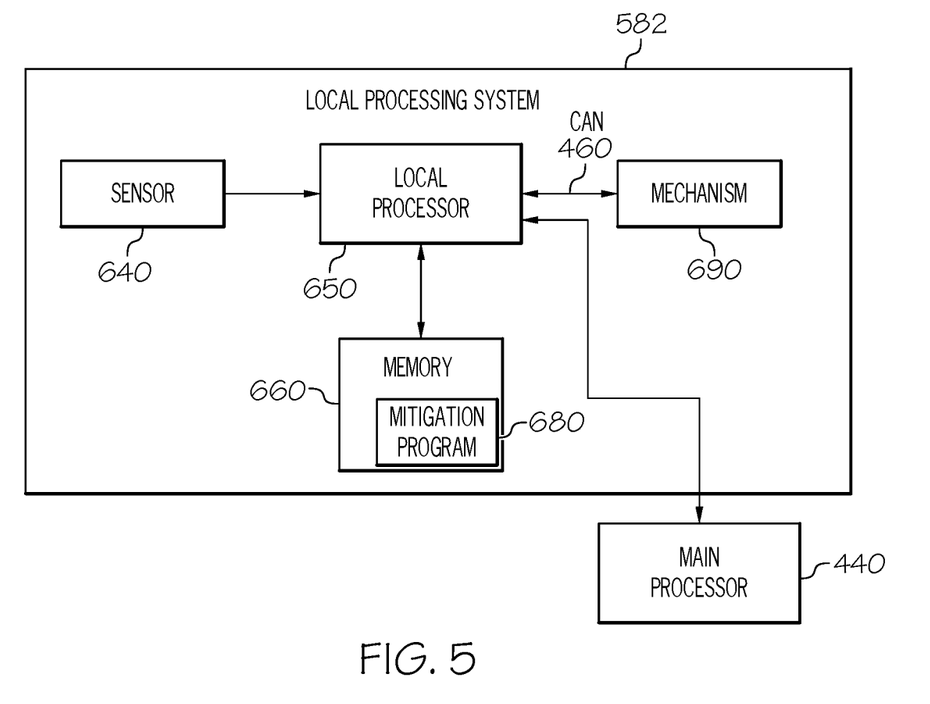
FIG. 5 schematically depicts a block diagram of a local processing system according to one or more embodiments shown and described herein.

The vehicle data processing system 400 described here includes the local processing systems 582, 584, 586 and 588 to reduce or minimize the response time for the vehicle 500. FIG. 5 depicts a system configuration of the local processing system 582 according to one or more embodiments are shown and described herein. The local processing system 582 is discussed in FIG. 5, and other local processing systems 584, 586 and 588 may have the same or similar structures. As shown in FIG. 5, the local processing system 582 includes a sensor 640, a local processor 650 and a memory 660. The local processor 650 is connected to the sensor 640 and the memory 660. The local processor 650 is connected to the main processor 440 via the CAN bus 460. The local processor 650 also may be connected to a mechanism 690.

In some embodiments, the mechanism 690 includes any mechanism that controls motions and actions of a vehicle. For instance, the mechanism 690 can be a brake system that stops a vehicle immediately. As another example, the mechanism 690 may be a door open prevention system, or a door locking system. As further another example, the mechanism 690 may be a window locking system. As yet another example, the mechanism 690 may include a lane change blocking system.

The memory 660 stores a predetermined mitigation program executed by the local processor 650. The predetermined mitigation program, upon execution by the local processor 650, performs operations to respond to the emergency situations. In some embodiments, the mitigation program may control a vehicle to take mitigation action(s) to mitigate the consequences of the emergency situation. Additionally, or alternatively, the mitigation program may control a vehicle to take prevention action(s) to prevent the consequence of the emergency situation.

Referring back to FIG. 3, the local processing systems 528, 584, 586 and 588 are arranged near each wheel of the vehicle 500. The wheel location is by way of example and various other locations are available. The arrangement of the local processing systems 582, 584, 586 and 588 may be determined to reduce or minimize data latency and data lag. For instance, the sensors 640 as shown in FIG. 5 and the local processor 650 may be arranged in proximity to each other to reduce or minimize data latency. As another example, the arrangement and positioning of the local processing systems 582, 584, 586 and 588 may also be in proximity to the mechanism 690 as shown in FIG. 5.

Alternatively, or additionally, the positioning of the local processing systems 582, 584, 586 and 588 may be determined to balance the data latency. The positioning of the sensors 640 and/or the mechanism 690 may be considered to determine the location of the local processing systems 582, 584, 586 and 588. In addition, a data flow path may be analyzed and determined and an optimal location of the local processing systems 582, 584, 586 and 588. For example, the local processor of the local processing system 582 ("first local processor") is associated with the sensors 640 by positioning the first local processor at a location proximate to the sensors 640. Proximity here may indicate data processing proximity between the first local processor and the sensors 640. Alternatively, or additionally, proximity may further indicate data transmission proximity between the first local processor and the sensors 640. Thus, the first local processor may be positioned to reduce or minimize the time needed for transmitting or processing data to and from the sensors 640.

In other embodiments, the local processor of the local processing system 584 ("second local processor") is associated with the control mechanism 690 by positioning the second local processor at a location proximate to the control mechanism 690. Proximity here may indicate data processing proximity between the second local processor and the control mechanism 690. Alternatively, or additionally, proximity may further indicate data transmission proximity between the second local processor and the control mechanism 690. Thus, the second local processor may be positioned to reduce or minimize the time needed for transmitting or processing data to and from the control mechanism 690.

As discussed above, positioning of the local processing systems 582, 584, 586 and 588 may be selected to accommodate and facilitate a reduced data processing time, a reduced data transmission time, or both. The data processing time and the data transmission time may involve the local processors, the sensors 640, and the control mechanism 690, but the embodiments described here may not be limited thereto. Positioning of the local processing systems 582, 584, 586 and 588 may further consider other components.

In some embodiments, the main processor 440 may be arranged at a location having a data transmission distance to the sensors 640 longer than a data transmission distance between the local processing systems 582, 584, 586 and 588 and the sensors 640. Alternatively, or additionally, the main processor 440 may be further arranged at a location having a data processing distance to the sensors 640 longer than a data processing distance between the local processing systems 582, 584, 586 and 588 and the sensors 640. Thus, the first and the second local processors discussed above may receive and process data points faster than the main processor 440 with respect to certain emergency events.

Alternatively, or additionally, the main processor 440 may be arranged at a location having a data transmission distance to the control mechanism 690 longer than a data transmission distance between the local processing systems 582, 584, 586 and 588 and the control mechanism 690. Alternatively, or additionally, the main processor 440 may be further arranged at a location having a data processing distance to the control mechanism 690 longer than a data processing distance between the local processing systems 582, 584, 586 and 588 and the control mechanism 690.

Figure 6:
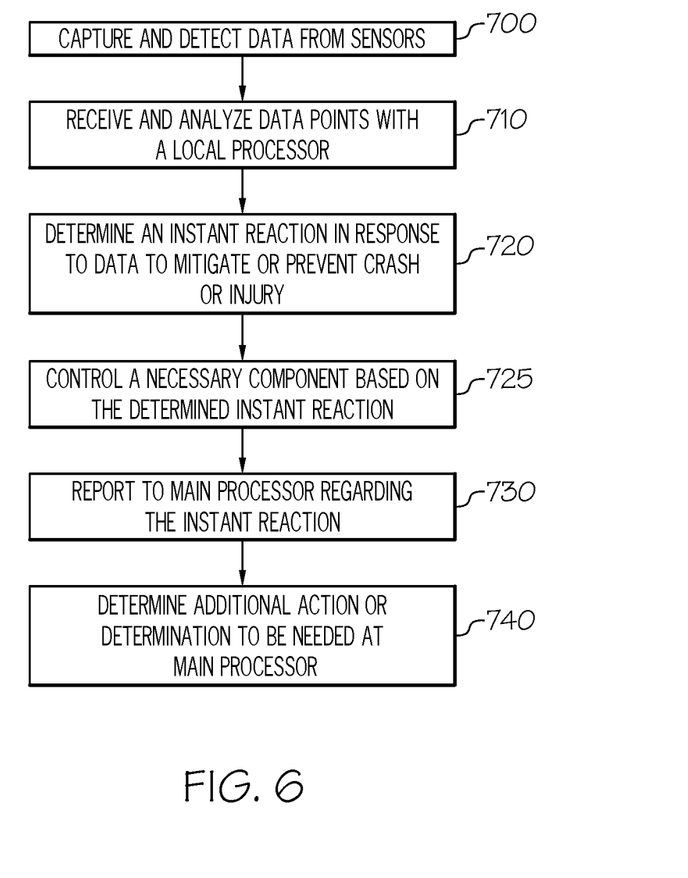
FIG. 6 depicts a flow chart of a vehicle data processing method using one or more local processors according to one or more embodiments shown and described herein.

FIG. 6 depicts a flow chart of a vehicle data processing method using one or more local processors according to one or more embodiments shown and described herein. At step 700, the sensors such as the sensor 640 in FIG. 5, capture and detect data points. In some embodiments, the emergency situation may involve a pedestrian jumping in front of a moving car. For example, a camera captures an image of the pedestrian, and a proximity sensor senses an object in proximity to the moving car. In addition, a speed sensor senses the moving speed of the car, and a temperature sensor senses outside temperature indicative of road conditions, etc. Data points from all of the sensors are sent to the local processor 650 which may be located in proximity to the sensors. Alternatively, or additionally, the local processor 650 may be located in proximity to the mechanism 690 (FIG. 5) which controls necessary components of the vehicle 500.

At Step 710, the local processor 650 receives and analyzes the data points. As a result of analysis, the local processor 650 determines the emergency situation where the pedestrian is jumping in front of the moving vehicle. The local processor 650 may determine an instant reaction in response to the emergency situation. (Step 720). The instant reaction may be intended to mitigate or potentially prevent crash or injury. For example, the instant reaction may be stopping the movement of the vehicle 500 immediately. As another example, the instant reaction may be steering the vehicle to a next lane to avoid crash to the pedestrian.

The instant reaction may be intended to mitigate or prevent an accident. In other words, the instant reaction here is relevant to any event potentially leading to an accident before an accident takes place. The local processing systems 582, 584, 586 and 588 involve functions for mitigating or preventing an accident and do not determine post-accident response or reactions such as deploying an airbag following crash.

The instant reaction may be intended to be limited to a simple, instantaneous action and does not involve complex reactions by the vehicle 500. In other words, the functions and the roles of the local processing systems 582, 584, 586 and 588 may be limited to specific and immediate reaction(s) to the emergency situation. In some embodiments, the mitigation program 680 may be programmed to define specific actions to the emergency situations. The specific actions may be correlated to identification of specific emergency situations. As discussed above, if a moving object is identified in proximity to a front side of a moving vehicle, such emergency situation is identified and a specific action to the identified situation may be triggered. The specific action may include stopping a moving vehicle immediately.

In some embodiments, the speed of the moving vehicle is fast and the moving vehicle may not have a sufficient distance to avoid a crash to the moving object even though the moving vehicle is immediately stopped. The mitigation program may be programmed to factor into the speed of the moving vehicle and correlate the moving object situation with another action, such as swerving into a next lane.

As another example, the emergency situation may include a vehicle occupant opening a door of a parked vehicle when another vehicle is approaching close to the side of the parked vehicle. The mitigation program may be programmed to correlate the emergency situation with the action of locking the door of the vehicle to avoid injury and damage to the vehicle.

Once the instant reaction is determined, the local processor 650 may control a necessary component based on the determined instant reaction. (Step 725). For instance, the local processor 650 may control the wheels 510, 520, 530 and 540 of the vehicle 500 to stop. As another example, the local processor 650 may control the wheels 510, 520, 530 and 540 of the vehicle 500 to steer into a different lane, or a different direction. As further another example, the local processor 650 may significantly lower the speed of the vehicle 500. In this case, any delay resulting from data latency and data lag may be avoided or minimized such that the mitigation time ($T_M$) 630 is shorter than the critical time ($T_C$) 610. The vehicle 500 may react to the emergency situation faster than the critical time ($T_C$) 610 and can stop the vehicle 500 before it may crash into the pedestrian, or slow down fast to minimize any injury in case the vehicle 500 may have any contact with the pedestrian.

Once the instant reaction may be taken, the local processor sends a message to the main processor 440 with respect to the instant reaction. (Step 730). The message includes information as to the emergency situation and the instant reaction. The main processor 440 determines additional action or determination to be needed at the main processor. (Step 740). In some embodiment, the main processor 440 stores and/or analyzes the information as to the emergency situation and the instant reaction. Alternatively, the main processor 440 may transmit such information to a cloud server for analysis and storage. The main processor 440 may include a predetermined logic to determine how to handle the information as to the emergency situation and the instant reaction from the local processing systems 582, 584, 586 and 588.

In some embodiments, the main processor 440 may have computing power and relevant programs stored in the memory. The relevant program may be adapted to analyze the emergency situations and the responses determined by the local processing systems 582, 584, 586 and 588 and learn and update the responses as relevant information from the local processing systems 582, 584, 586 and 588 may be continuously received and analyzed. For example, the relevant program may include machine language based programs, deep learning algorithm based programs, a pattern recognition programs, etc. In other embodiments, the main processor 440 may store the information from the local processing systems 582, 584, 586 and 588 temporarily and transmit to a cloud server.

In another embodiment, the main processor 440 may determine if additional action(s) need to follow. (Step 740). For instance, the main processor 440 may determine to unlock the vehicle door when the local processing system 582 controls the vehicle to be locked in response to the emergency situation where the vehicle door, if opened, was going to crash to the passing vehicle. In some embodiments, the main processor 440 may determine that the emergency situation was changed as the passing vehicle moved away based on the data from the sensors and determine a follow action, i.e., unlocking the door. In other embodiments, the local processing system 582 may determine that the emergency situation was changed. The main processor 440 may determine additional or follow-up actions to the actions taken by the local processing systems 582, 584, 586 and 588, without adaptation and learning of response patterns by the local processing systems 582, 584, 586 and 588. This type of determination may not require complex logic and can be handled with relatively simpler logic.

As discussed above, the main processor 440 may transmit to a cloud server the information relating to the emergency situations and actions taken by the local processing systems 582, 584, 586 and 588. The cloud server such as the central server 300 may have high processing functions and artificial intelligence based programs such that it can analyze and learn the emergency situations and the correlated responses and use the learning to upgrade, modify and improve the responses. In addition, the cloud server may receive relevant data sets from a large pool of vehicles and be in a better position to analyze and learn the relevant information. For instance, the cloud server may receive the emergency situations and responses by the local processing systems 582, 584, 586 and 588 from 5,000 vehicles of the same brand and model and diagnose the responses taken in those vehicles.

Figure 7:
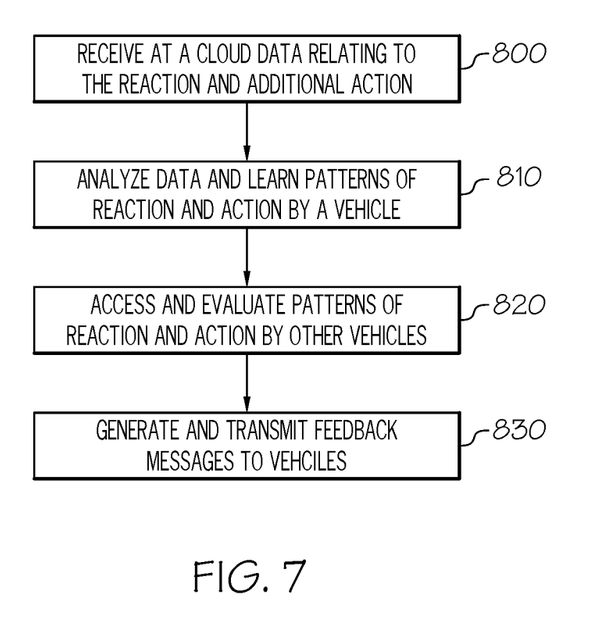
FIG. 7 depicts a flow chart of a vehicle data processing method at a cloud server according to one or more embodiments shown and described herein.

FIG. 7 depicts a flow chart of the vehicle data processing method at a cloud server according to one or more embodiments shown and described herein. The cloud server, such as the central server 300 (FIG. 1), receives data sets relating to the emergency situations and reactions taken by the local processing systems 582, 584, 586 and 588. (Step 800). The cloud server also may receive data sets relating to the additional actions and follow-up actions taken by the main processor 440. (Step 800). The cloud server then analyzes the received data sets and learns patterns of reaction and action by various processors of vehicles. (Step 810). The cloud server receives data sets from various vehicles such that the cloud server can access and evaluate patterns of reactions and actions by a large pool of vehicles. (Step 820).

The large pool of vehicles may include vehicles of the same make and model, vehicles having different sizes and types, vehicles driving in the same or similar road and climate conditions, etc. The cloud server may classify the large pool of vehicles into one or more discreet classes and store and categorize the received data sets based on the classes. For example, the cloud server may collect and store the received data sets from the same model and brand of vehicles in order to come up with specific diagnostics for that model/brand vehicle. As another example, the cloud server may collect and store the received data sets from the vehicles driving in the same road and climate conditions to analyze the reaction and follow-up actions by the local and the main processors in order to determine the nature and the details of the reactions and follow-up actions. In other embodiments, the cloud server may separate and divide the received data sets regarding the reactions from the local processors and the follow-up actions from the main processors.

Based on the analysis and evaluation, the cloud server generates feedback messages and transmits the messages to the vehicles. (Step 830). The feedback messages include information that requires the processors to adapt their reactions and follow-up actions to different or modified reactions and actions. The feedback messages may be based on learning from the analysis of the reactions and actions by various vehicles and adaptation reflecting and resulting from the learning. The main processors and the local processing systems 582, 584, 586 and 588 may modify and supplement the programmed reactions and actions based on the feedback messages. Accordingly, vehicles may take more optimal reactions and actions to the emergency situations and further mitigate or prevent accidents and resulting injuries and/or damages.

As discussed in the embodiments above, a vehicle data processing method includes arranging a main processor in a vehicle comprising one or more control mechanisms, arranging one or more sensors in and around the vehicle, and arranging one or more local processors in proximity to one of the sensors, the control mechanisms, or both. The vehicle data processing method further includes receiving data points from the sensors, identifying one or more emergency events based on the received data points, determining, with the one or more local processors, an instant reaction in response to the emergency events, and controlling the control mechanisms based on the determined instant reaction.

In some embodiments, the step of controlling the control mechanism further includes controlling the control mechanism to control a motion of one or more components of the vehicle. In another embodiment, the step of controlling the control mechanism further includes controlling the control mechanism to forgo a motion of one or more components of the vehicle whereby injury and damage to the vehicle are mitigated or prevented. In yet another embodiment, the step of determining the instant reaction further includes retrieving the instant reaction correlated to the identified emergency events. In yet another embodiment, the step of arranging the local processors further includes arranging the local processors in one or more wheels of the vehicle.

In some embodiments, the step of arranging the local processors further includes selecting one or more positions of the local processors to minimize data latency between the sensors and the local processors, between the control mechanisms and the local processors, or both.

In another embodiment, the vehicle data processing method further includes transmitting a message relating to the instant reaction to the main processor, and determining, with the main processor, whether a follow-up action to the instant reaction is needed. In yet another embodiment, the vehicle data processing method further includes transmitting the message relating to the instant reaction to a cloud server.

In yet another embodiment, the step of identifying one or more emergency events further includes classifying the data points into the one or more emergency events that are predetermined and stored in a memory arranged in the vehicle.

In another embodiment, a vehicle data processing method includes arranging one or more sensors in and around a vehicle, arranging one or more local processors at one or more locations of the vehicle, and associating a first local processor with a first emergency event detected by the first group of the sensors by positioning the first local processor at a first location in data processing proximity to the first group of the sensors. The vehicle data processing method further includes associating a second local processor with a second emergency event detected by the second group of the sensors by positioning the second local processor at a second location in data processing proximity to the second group of the sensors, identifying one or more emergency events based on the data points from the one or more sensors, determining, with the first local processor, a first instant reaction in response to the first emergency event, determining, with the second local processor, a second instant reaction in response to the second emergency event, and controlling one or more control mechanisms based on the first instant reaction, the second instant reaction, or both.

In another embodiment, the vehicle data processing method further includes arranging a main processor at a third location having a data transmission distance from the first group of the sensors longer than the first location. In yet another embodiment, a response time of the first instant reaction is shorter than a critical time needed to avoid a crash resulting from the first emergency event.

In yet another embodiment, the vehicle data processing method further includes associating the first local processor with a first group of the control mechanisms by positioning the first local processor at a location in data transmission proximity to the first group of the control mechanisms.

In yet another embodiment, the vehicle data processing method further includes associating the second local processor with a second group of the control mechanisms by positioning the second local processor at a location in data processing proximity to the second group of the control mechanisms.

In another embodiment, a vehicle data processing system includes a main processor, one or more control mechanisms, one or more local processing units, each unit including a local processor in proximity to one or more sensors, the control mechanisms, or both, a memory module coupled to the local processor, machine readable instructions stored in the memory, and a control area network (CAN) bus connected to the main processor, the one or more control mechanisms, and the one or more local processing units. The machine readable instructions, upon execution by the local processor, perform at least the following including (i) receiving data points from the sensors, (ii) identifying one or more emergency events based on the received data points from the one or more sensors, (iii) determining an instant reaction in response to the identified emergency events, and (iv) outputting the instant reaction to the control mechanisms. The control mechanisms are configured to perform or suppress a motion of a vehicle based on the instant reaction.

In another embodiment, the main processor is configured to (i) receive a message relating to the instant reaction from the local processing units via the CAN bus; (ii) determine whether or not to supplement the instant reaction; and (iii) control the control mechanisms to perform or suppress a follow-up action.

In yet another embodiment, the vehicle data processing system further includes a data communication unit communicatively connected to a network. The main processor is operable to (i) receive a message relating to the instant reaction from the local processing units via the CAN bus; (ii) transmit the message relating to the instant reaction to a cloud server via the data communication unit over the network; and (iii) receive a feedback message from the cloud server, the feedback message including modification information to the instant reaction.

In yet another embodiment, the one or more local processing units include a first local processor and a second local processor, the sensors comprise a first group of sensors and a second group of sensors, the first local processor is associated with a first emergency event detected by the first group of the sensors by positioning the first local processor at a first location in data processing proximity to the first group of sensor, and the second local processor is associated with a second emergency event detected by the second group of the sensors by positioning the second local processor at a second location in data processing proximity to the second group of sensors.

In yet another embodiment, the control mechanisms comprises a first group of control mechanisms and a second group of control mechanisms, the one or more local processing units comprises a first local processor and a second local processor, the first local processor is associated with the first group of control mechanisms by positioning the first local processor at a location in data transmission proximity to the first group of control mechanisms and the second local processor is associated with the second group of control mechanisms by positioning the second local processor at a location in data processing proximity to the second group of control mechanisms. In yet another embodiment, the local processing units are mounted in one or more of wheels of the vehicle.

In yet another embodiment, a vehicle data processing system for a vehicle includes a first local processor associated with a first emergency event detected by a first group of sensors in data processing proximity to the first local processor, and a second local processor associated with a second emergency event detected by a second group of sensors in data processing proximity to the second local processor. The first local processor is operable to identify the first emergency event based on data points from one or more sensors and determine a first instant reaction in response to the first emergency event. The second local processor is operable to identify the second emergency event based on the data points from the one or more sensors and determine a second instant reaction in response to the second emergency event. The vehicle data processing system further includes one or more control mechanisms operable to control a motion of a vehicle based on the first instant reaction, the second instant reaction, or both.

In yet another embodiment, the vehicle data processing system further includes a main processor arranged at a third location having a data transmission distance from the first group of the sensors longer than the first location. In yet another embodiment, the first local processor is associated with a first group of the control mechanisms such that the first local processor is positioned at a location in data transmission proximity to a first group of the one or more control mechanisms. In yet another embodiment, the second local processor is associated with a second group of the control mechanisms by positioning the second local processor at a location in data processing proximity to a second group of the one or more control mechanisms.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle data processing method, comprising:
   receiving data points from one or more sensors arranged in or around a vehicle having a main processor and one or more local processors, wherein the one or more local processors are located in closer proximity than the main processor to one or more sensors, a control mechanism, or both;
   identifying one or more events based on the received data points from the sensors;
   determining, with the one or more local processors of the vehicle, an instant reaction in response to the events;
   controlling the control mechanism of the vehicle based on the determined instant reaction;
   transmitting a message relating to the instant reaction to the main processor; and
   determining, with the main processor, whether a follow-up action to the instant reaction is needed.

2. The method of claim 1, wherein the step of controlling the control mechanism further comprises controlling the control mechanism to control a motion of one or more components of the vehicle.

3. The method of claim 1, wherein the step of controlling the control mechanism further comprises controlling the control mechanism to forgo a motion of one or more components of the vehicle whereby injury and damage to the vehicle are mitigated or prevented.

4. The method of claim 1, wherein the step of determining the instant reaction further comprises retrieving the instant reaction correlated to the identified events.

5. The method of claim 1, further comprising:
   selecting one or more positions of the one or more local processors to minimize data latency between the sensors and the one or more local processors, between the control mechanism and the one or more local processors, between the main processor and the one or more local processors, or combinations thereof.

6. The method of claim 1, further comprising arranging the one or more local processors in one or more wheels of the vehicle.

7. The method of claim 1, further comprising transmitting the message relating to the instant reaction to a cloud server.

8. The method of claim 1, wherein the step of identifying one or more events further comprises classifying the data points into the one or more events that are predetermined and stored in a memory arranged in the vehicle.

9. A vehicle data processing system, comprising:
   a main processor;
   a first local processor associated with a first event detected by a first group of sensors in closer data processing proximity to the first local processor than the main processor;
   and a second local processor associated with a second event detected by a second group of sensors in closer data processing proximity to the second local processor than the main processor,
   wherein the first local processor is operable to:
      identify the first event based on data points from the first group of sensors; and
      determine a first instant reaction in response to the first event;
   wherein the second local processor is operable to:
      identify the second event based on the data points from the second group of sensors;
      determine a second instant reaction in response to the second event;
      transmit a message relating to at least one of the first instant reaction and the second instant reaction to the main processor; and
      determine, with the main processor, whether a follow-up action to at least one of the first instant reaction and the second instant reaction is needed; and
   one or more control mechanisms operable to control a motion of a vehicle based on the first instant reaction, the second instant reaction, or both.

10. The system of claim 9, wherein the positions of the first and second local processors are selected to minimize data latency between sensors and the first and second local processors, between the one or more control mechanisms and the first and second local processors, between the main processor and the first and second local processors, or combinations thereof.

11. The system of claim 9, wherein the first local processor is associated with a first group of the control mechanisms such that the first local processor is positioned at a location in data transmission proximity to a first group of the one or more control mechanisms.

12. The system of claim 11, wherein the second local processor is associated with a second group of the control mechanisms by positioning the second local processor at a location in data processing proximity to a second group of the one or more control mechanisms.

13. A vehicle data processing system, comprising:
   a main processor;
   one or more control mechanisms;
   one or more local processing units, each of the one or more local processing units comprising:

a local processor in closer proximity than the main processor to one or more sensors, the control mechanisms, or both;

a memory module coupled to the local processor;

machine readable instructions stored in the memory and upon execution by the local processor, performing at least the following:

receiving data points from the sensors;

identifying one or more events based on the data points from the one or more sensors;

determining an instant reaction in response to the identified events;

outputting the instant reaction to the one or more control mechanisms;

transmitting a message relating to the instant reaction to the main processor; and determining, with the main processor, whether a follow-up action to the instant reaction is needed;

a control area network (CAN) bus connected to the main processor, the control mechanisms, and the local processing units;

wherein the control mechanisms are configured to perform or suppress a motion of a vehicle based on the instant reaction.

14. The system of claim 13, wherein the main processor is configured to:

receive a message relating to the instant reaction from the local processing units via the CAN bus;

determine whether or not to supplement the instant reaction; and control the control mechanisms to perform or suppress a follow-up action.

15. The system of claim 13, further comprising a data communication unit communicatively connected to a network;

wherein the main processor is operable to:

receive a message relating to the instant reaction from the one or more local processing units via the CAN bus;

transmit the message relating to the instant reaction to a cloud server via the data communication unit over the network; and receive a feedback message from the cloud server, the feedback message including modification information to the instant reaction.

16. The system of claim 13, wherein:

the local processing units comprise a first local processor and a second local processor;

the sensors comprise a first group of sensors and a second group of sensors;

the first local processor is associated with a first event detected by the first group of the sensors by positioning the first local processor at a first location in data processing proximity to the first group of sensor; and the second local processor is associated with a second event detected by the second group of the sensors by positioning the second local processor at a second location in data processing proximity to the second group of sensors.

17. The system of claim 13, wherein:

the control mechanisms comprise a first group of control mechanisms and a second group of control mechanisms;

the one or more local processing units comprise a first local processor and a second local processor;

the first local processor is associated with the first group of control mechanisms by positioning the first local processor at a location in data transmission proximity to the first group of control mechanisms; and the second local processor is associated with the second group of control mechanisms by positioning the second local processor at a location in data processing proximity to the second group of control mechanisms.

18. The method of claim 13, wherein a response time of the instant reaction is shorter than a critical time needed to avoid a crash resulting from the events.

19. The system of claim 13, wherein the local processing units are mounted in one or more of wheels of the vehicle.

* * * * *

UNITED STATES PATENT AND TRADEMARK OFFICE
CERTIFICATE OF CORRECTION

PATENT NO. : 11,186,273 B2  
APPLICATION NO. : 16/175294  
DATED : November 30, 2021  
INVENTOR(S) : Felipe G. Salles Page 1 of 1

It is certified that error appears in the above-identified patent and that said Letters Patent is hereby corrected as shown below:

On the Title Page

Item (74), attorney, agent, or firm, after "Dinsmore & Shohl", delete ",".

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*